UNITED STATES PATENT OFFICE.

HUGO GALLINOWSKY, OF NEW YORK, N. Y., ASSIGNOR OF ONE-HALF TO LOUIS KLUEBER, OF SAME PLACE.

COMPOSITION OF MATTER FOR THE PRODUCTION OF ARTIFICIAL SLATE.

SPECIFICATION forming part of Letters Patent No. 303,146, dated August 5, 1884.

Application filed March 31, 1884. (No specimens.)

*To all whom it may concern:*

Be it known that I, HUGO GALLINOWSKY, a citizen of Austria, residing at East New York, Kings county, and State of New York, have invented a new and useful Composition of Matter to be Used for the Production of Artificial Slate, of which the following is a specification.

My composition consists of the following ingredients, combined in the proportions about as stated, viz: powdered animal-bone, about fifteen parts; white lead, about one part, and linseed-oil. These ingredients are prepared, mixed, and applied in the following manner: Animal-bones, preferably bones from sheep, are burned in an open chamber or vessel to allow the free admission of air, and to obtain the same as white as possible. The thus burned bones are then ground very fine and sieved. Of this finely-powdered burned bones fifteen (15) parts are mixed with about one (1) part of white lead, with the addition of sufficient linseed-oil to produce a mass capable of being used as a paint and applied with a brush. The material—such as paper, pasteboard, linen, or any other suitable material to form the body of the artificial slate—is then painted on one or both sides with this composition several times until the desired thickness is obtained on the material, allowing each coating to dry before the next coat of paint is applied. After the desired thickness of paint or composition has thus been applied to the material, the same is allowed to dry thoroughly for several days in a dry, warm room, without the application of artificial heat, and is then polished by means of pumice-stone dipped in linseed-oil to a smoothness capable of being written upon by a lead pencil, and can thus be used similar to a slate, the pencil-marks being at any time easily removed by the application of a little moisture.

By using more or less white lead the color of this artificial slate may be varied, and, if desired, any desired coloring-matter may be added.

What I claim, and desire to secure by Letters Patent of the United States, is—

The herein-described composition of matter to be used as a paint to be applied to a suitable material, consisting of finely-powdered burned bones, white lead, and linseed-oil, in the proportions specified.

HUGO GALLINOWSKY.

Witnesses:
HENRY E. RAEDER,
LEWIS KEMBER.